(12) United States Patent
He et al.

(10) Patent No.: US 12,198,405 B2
(45) Date of Patent: Jan. 14, 2025

(54) METHOD, DEVICE, AND COMPUTER PROGRAM PRODUCT FOR TRAINING IMAGE CLASSIFICATION MODEL

(71) Applicant: Dell Products L.P., Round Rock, TX (US)

(72) Inventors: Bin He, Shanghai (CN); Zijia Wang, WeiFang (CN); Zhen Jia, Shanghai (CN); Jinpeng Liu, Shanghai (CN)

(73) Assignee: Dell Products L.P., Round Rock, TX (US)

(*) Notice: Subject to any disclaimer, the term of this patent is extended or adjusted under 35 U.S.C. 154(b) by 366 days.

(21) Appl. No.: 17/850,545

(22) Filed: Jun. 27, 2022

(65) Prior Publication Data

US 2023/0401818 A1 Dec. 14, 2023

(30) Foreign Application Priority Data

Jun. 10, 2022 (CN) .......................... 202210657489.4

(51) Int. Cl.
| | | |
|---|---|---|
| *G06V 10/82* | (2022.01) | |
| *G06N 3/08* | (2023.01) | |
| *G06V 10/764* | (2022.01) | |

(52) U.S. Cl.
CPC ............. *G06V 10/764* (2022.01); *G06N 3/08* (2013.01); *G06V 10/82* (2022.01)

(58) Field of Classification Search
CPC ...... G06V 10/764; G06V 10/82; G06V 20/58; G06N 3/08; G06N 3/0464
See application file for complete search history.

(56) References Cited

U.S. PATENT DOCUMENTS

2021/0232890 A1* 7/2021 Li .......................... G06N 3/063
2021/0295213 A1* 9/2021 Raveh .................. G06V 10/764

OTHER PUBLICATIONS

Junjiao Tian, Niluthpol Mithun, Zach Seymour, Han-Pang Chiu, Zsolt Kir, Feb. 3, 2022 ("Striking the Right Balance: Recall Loss for Semantic Segmentation") Arxiv: 2106.14917v2 (Year: 2022).*

(Continued)

*Primary Examiner* — Ian L Lemieux
*Assistant Examiner* — William Le
(74) *Attorney, Agent, or Firm* — Ryan, Mason & Lewis, LLP (57) ABSTRACT

Embodiments disclosed herein relate to a method, a device, and a computer program product for training an image classification model. The method includes: determining a first classification result obtained by the image classification model on pixel points of a sample image in a first training iteration, wherein the first classification result indicates that each of the pixel points belongs to one of a plurality of object classes; determining a second classification result obtained by the image classification model on the pixel points of the sample image in a second training iteration; determining, based on the first classification result and the second classification result, a first set of recall rates and a second set of recall rates for the plurality of object classes; and adjusting, based on the first set of recall rates and the second set of recall rates, the image classification model to obtain a trained image classification model.

20 Claims, 5 Drawing Sheets

(56) References Cited

OTHER PUBLICATIONS

J. Tian et al., "Striking the Right Balance: Recall Loss for Semantic Segmentation," arXiv:2106.14917v2, Feb. 3, 2022, 7 pages.

G. Van Horn et al., "The iNaturalist Species Classification and Detection Dataset," Conference on Computer Vision and Pattern Recognition, IEEE, Jun. 2018, pp. 8769-8778.

M. A. Rahman et al., "Optimizing Intersection-Over-Union in Deep Neural Networks for Image Segmentation," International Symposium on Visual Computing, Dec. 2016, 11 pages.

K. Cao et al., "Learning Imbalanced Datasets with Label-Distribution-Aware Margin Loss," arXiv:1906.07413v2, Oct. 27, 2019, 18 pages.

Y. Cui et al., "Class-Balanced Loss Based on Effective Number of Samples," arXiv:1901.05555v1, Jan. 16, 2019, 11 pages.

B. Zhou et al., "BBN: Bilateral-Branch Network with Cumulative Learning for Long-Tailed Visual Recognition," arXiv:1912.02413v4, Mar. 10, 2020, 14 pages.

T.-Y. Lin et al., "Focal Loss for Dense Object Detection," arXiv:1708.02002v2, Feb. 7, 2018, 10 pages.

M. Berman et al., "The Lovasz-Softmax Loss: A Tractable Surrogate for the Optimization of the Intersection-over-union Measure in Neural Networks," arXiv:1705.08790v2, Apr. 9, 2018, 14 pages.

C. H. Sudre et al., "Generalised Dice Overlap as a Deep Learning Loss Function for Highly Unbalanced Segmentations," arXiv:1707.03237v3, Jul. 14, 2017, 8 pages.

S. S. M. Salehi et al., "Tversky Loss Function for Image Segmentation Using 3D Fully Convolutional Deep Networks," arXiv:1706.05721v1, Jun. 18, 2017, 9 pages.

S. A. Taghanaki et al., "Combo Loss: Handling Input and Output Imbalance in Multi-Organ Segmentation," arXiv:1805.02798v6, Sep. 15, 2021, 9 pages.

A. Shrivastava et al., "Training Region-based Object Detectors with Online Hard Example Mining," arXiv:1604.03540v1, Apr. 12, 2016, 9 pages.

U.S. Appl. No. 17/829,658 filed in the name of Zijia Wang et al. on Jun. 1, 2022, and entitled "Method, Electronic Device, and Computer Program Product for Image Segmentation."

* cited by examiner

METHOD, DEVICE, AND COMPUTER PROGRAM PRODUCT FOR TRAINING IMAGE CLASSIFICATION MODEL

RELATED APPLICATION(S)

The present application claims priority to Chinese Patent Application No. 202210657489.4, filed Jun. 10, 2022, and entitled "Method, Device, and Computer Program Product for Training Image Classification Model," which is incorporated by reference herein in its entirety.

FIELD

Embodiments of the present disclosure generally relate to the field of image processing, and in particular to a method, a device, and a computer program product for training an image classification model.

BACKGROUND

With the development of computer and network technologies in recent years, it is common to transfer some computational tasks to edge devices of a network for faster service provision to users.

In addition, with the development of artificial intelligence, computer vision technology is also evolving rapidly. Computer vision tasks process captured pictures or videos to recognize information in the images. Computer vision tasks mainly include image classification, target detection, target tracking, and image segmentation. As edge devices are capable of processing more tasks, some computer vision processing tasks are also transferred to edge devices for execution. Although great progress has been made in processing computer vision tasks using edge devices, there are still many problems that need to be solved in the process.

SUMMARY

Embodiments of the present disclosure provide a method, a device, and a computer program product for training an image classification model.

According to a first aspect of the present disclosure, a method for training an image classification model is provided. The method includes: determining a first classification result obtained by the image classification model on pixel points of a sample image in a first training iteration, wherein the first classification result indicates that each of the pixel points belongs to one of a plurality of object classes. The method further includes: determining a second classification result obtained by the image classification model on the pixel points of the sample image in a second training iteration. The method further includes: determining, based on the first classification result and the second classification result, a first set of recall rates and a second set of recall rates for the plurality of object classes. The method further includes: adjusting, based on the first set of recall rates and the second set of recall rates, the image classification model to obtain a trained image classification model.

According to a second aspect of the present disclosure, an electronic device is provided. The electronic device includes at least one processor; and a memory, coupled to the at least one processor and having instructions stored thereon, wherein the instructions, when executed by the at least one processor, cause the device to execute actions including: determining a first classification result obtained by an image classification model on pixel points of a sample image in a first training iteration, wherein the first classification result indicates that each of the pixel points belongs to one of a plurality of object classes; determining a second classification result obtained by the image classification model on the pixel points of the sample image in a second training iteration; determining, based on the first classification result and the second classification result, a first set of recall rates and a second set of recall rates for the plurality of object classes; and adjusting, based on the first set of recall rates and the second set of recall rates, the image classification model to obtain a trained image classification model.

According to a third aspect of the present disclosure, a computer program product is provided, which is tangibly stored on a non-transitory computer-readable medium and includes machine-executable instructions, wherein the machine-executable instructions, when executed by a machine, cause the machine to perform the steps of the method in the first aspect of the present disclosure.

BRIEF DESCRIPTION OF THE DRAWINGS

By more detailed description of example embodiments of the present disclosure, provided herein with reference to the accompanying drawings, the above and other objectives, features, and advantages of the present disclosure will become more apparent, where identical reference numerals generally represent identical components in the example embodiments of the present disclosure.

In the drawings, identical or corresponding numerals represent identical or corresponding parts.

DETAILED DESCRIPTION

Illustrative embodiments of the present disclosure will be described in more detail below with reference to the accompanying drawings. Although the drawings show some embodiments of the present disclosure, it should be understood that the present disclosure can be implemented in various forms, and should not be explained as being limited to the embodiments stated herein. Instead, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

As described above, computer vision tasks include semantic segmentation and image classification, and the like. The aforementioned computer vision tasks are typically implemented by convolutional neural networks in the field of deep learning. In a convolutional neural network, a feature extractor with a set of convolutional layers is typically provided, and then a pooling layer is used to make an image less sensitive to small transformations and remaining unchanged. The final stage of the convolutional neural network model is a classifier, which classifies each pixel into one of several classes. However, this use of convolutional neural networks for computer vision tasks requires a large amount of computing resources.

For example, in image processing for scenarios such as autonomous driving, it is sometimes necessary to use edge devices for inference of an image classification model. Therefore, some collaborative computing frameworks are used to implement computation on edge devices. However, these solutions suffer from problems such as bandwidth limitations and latency issues.

In addition, data set imbalance is an important issue for many computer vision tasks. As in semantic segmentation, imbalances are naturally arising and vary in size across classes. For example, in an outdoor driving segmentation dataset, light poles and pedestrians are considered as small classes compared to large classes such as buildings, sky, and roads, which account for large proportions in pictures. For safety reasons, these small classes are usually more important than large ones. When unbalanced data sets are presented, standard loss functions, such as cross-entropy loss functions, usually produce unsatisfactory results. This is because the training process is naturally biased toward large classes, resulting in low accuracy and precision for small classes.

At least to address the above and other potential problems, embodiments of the present disclosure provide a method for training an image classification model. In this method, a computing device uses image classification results from previous training iterations to determine a recall rate corresponding to each of a plurality of object classes. Two sets of recall rates from the two previous iterations are then used to adjust the image classification model to be used currently. Through this method, the weights of small classes can be dynamically adjusted to better balance the accuracy for small and large classes, and the computational cost can be reduced, thus realizing arrangement on edge devices.

Figure 1:
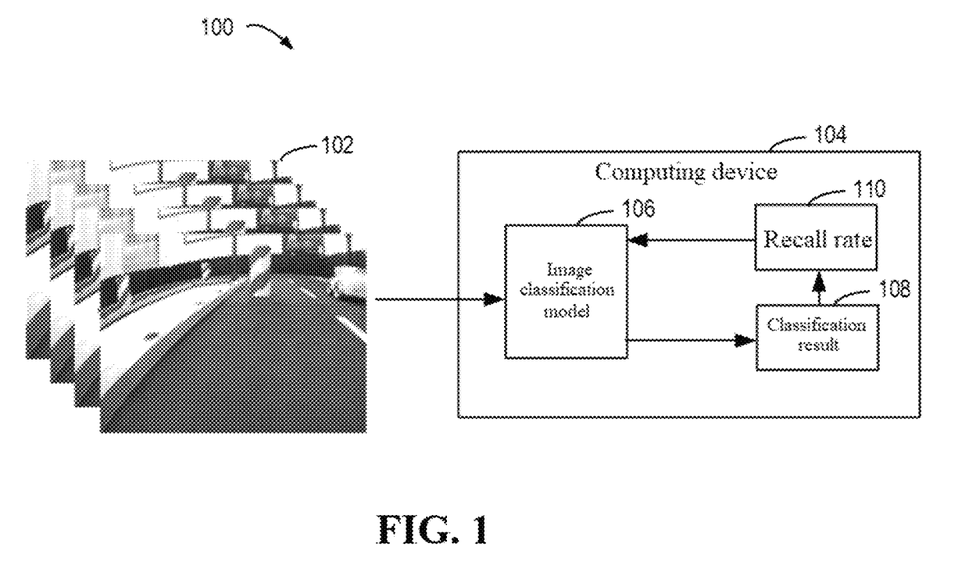
FIG. 1 illustrates a schematic diagram of an example environment in which a device and/or a method according to embodiments of the present disclosure can be implemented.

Embodiments of the present disclosure will be described in further detail below in conjunction with the accompanying drawings, where FIG. 1 illustrates example environment 100 in which the device and/or method of embodiments of the present disclosure may be implemented.

Environment 100 includes computing device 104, and computing device 104 is used for training image classification model 106. FIG. 1 illustrates one computing device, which is an example only and not a specific limitation to the present disclosure. A person skilled in the art may set as needed the number of computing devices for training an image classification model.

Examples of computing device 104 include, but are not limited to, a personal computer, a server computer, a handheld or laptop device, a mobile device (such as a mobile phone, a personal digital assistant (PDA), and a media player), a multi-processor system, a consumer electronic product, a minicomputer, a mainframe computer, a distributed computing environment including any of the above systems or devices, etc.

Computing device 104 is used to receive one or more images 102. In some embodiments, images 102 may be sample images for training image classification model 106. In some embodiments, images 102 are test images for testing image classification model 106. In some embodiments, images 102 include sample images for training image classification model 106 and test images for testing image classification model 106. The above examples are intended to describe the present disclosure only and are not specific limitations to the present disclosure.

Image classification model 106 is used to classify each of the pixel points in images 102 into various object classes. For example, if the image is an image of the environment surrounding a vehicle in autonomous driving, each of the pixel points in the image can be classified into one of the different object classes such as a light pole, a pedestrian, or a building. In some embodiments, the image classification model is a machine model. Further, the image classification model is a neural network model, such as a convolutional neural network model. The above examples are only for describing the present disclosure, rather than specifically limiting the present disclosure.

When training image classification model 106, computing device 104 initializes a loss function for that image classification model 106, including a weight in the loss function for each object class. The image classification model is then trained iteratively using images 102. The loss function is used in each iteration of training to adjust parameters of the image classification model.

During the training of the image classification model, the weights of the loss function are dynamically adjusted after at least one iteration cycle. Computing device 104 uses classification result 108 from the previous iteration cycles to calculate recall rate 110 for each object class. The recall rate is then used to determine a candidate object class corresponding to the weight coefficient that needs to be adjusted. Then, the weight of the loss function corresponding to that candidate object class is adjusted. Then, the loss function of which the weight has been adjusted is applied to the subsequent iterative training of the image classification model.

Through this method, the weights of small classes can be dynamically adjusted to better balance the accuracy for small and large classes, and the computational cost can be reduced, thus realizing arrangement on edge devices.

The block diagram of example environment 100 in which embodiments of the present disclosure can be implemented has been described in the foregoing in conjunction with FIG. 1. A flow chart of method 200 for training an image classification model according to an embodiment of the present disclosure is described below in conjunction with FIG. 2. Method 200 may be executed at computing device 104 in FIG. 1.

Figure 2:
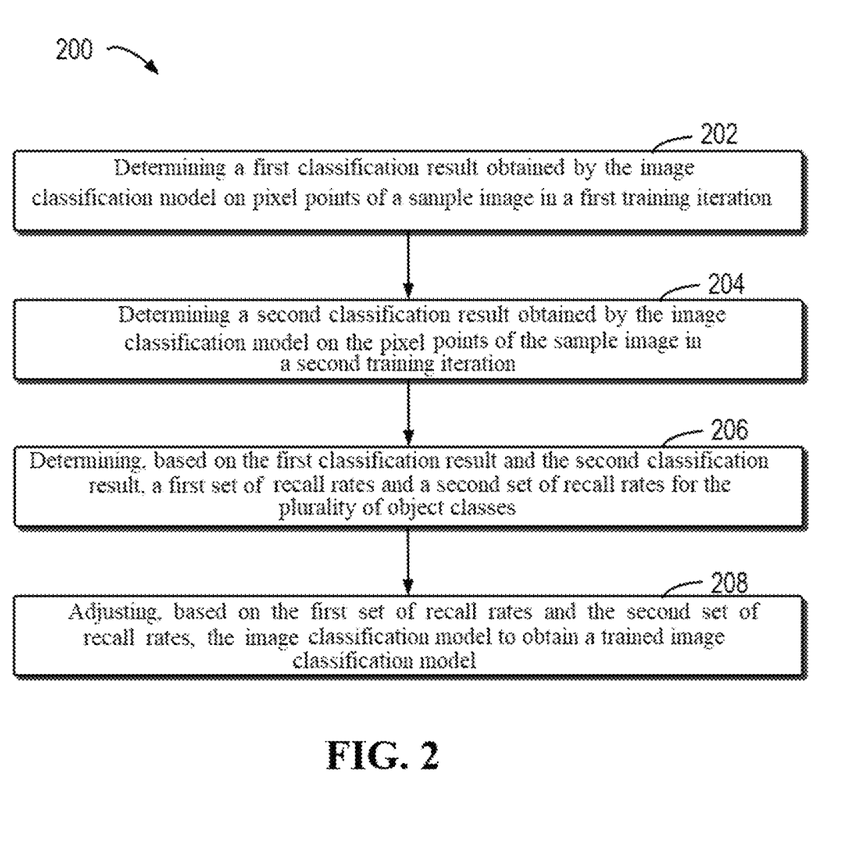
FIG. 2 illustrates a flow chart of a method for training an image classification model according to an embodiment of the present disclosure.

At block 202, computing device 104 determines a first classification result obtained by an image classification model on pixel points of a sample image in a first training iteration, wherein the first classification result indicates that each of the pixel points belongs to one of a plurality of object classes.

In some embodiments, computing device 104 initializes weights of a loss function for the image classification model prior to running image classification model 106. The loss function for the image classification model is formed by combining the loss function value for each class with its corresponding weight. For example, an image classification model that classifies two object classes A and B has the following loss function as shown in Equation (1):

$$L = W_A L(A) + W_B L(B) \qquad (1)$$

where $W_A$ denotes the weight for object class A and $W_B$ denotes the weight for object class B, and where L(A) and L(B) denote the loss value for class A and the loss value for object class B, respectively. In an example, the loss function is a cross-entropy loss function. In another example, the loss function is a KL scatter loss function. The above examples are intended to describe the present disclosure only and are not specific limitations to the present disclosure. A person skilled in the art may set as needed the required loss function.

When initializing the loss function, based on the number of a plurality of object classes, a plurality of weights in the loss function for the plurality of object classes may be determined. For example, if the image classification model can be classified into N classes, the initial weight corresponding to each class may be set to 1/N. In this way, the loss function can be initialized quickly.

After the initial loss function weights are set, the image classification model may be used to iteratively process the sample images. In each training iteration, a classification result is calculated for each pixel point in the image by the image classification model.

At block 204, computing device 104 determines a second classification result obtained by the image classification model on the pixel points of the sample image in a second training iteration. In an example, the first training iteration and the second training iteration are two adjacent training iterations. In another example, the first training iteration and the second training iteration are iterations separated by a predetermined number iterations. The above examples are intended to describe the present disclosure only and are not specific limitations to the present disclosure.

At block 206, computing device 104 determines, based on the first classification result and the second classification result, a first set of recall rates and a second set of recall rates for the plurality of object classes, respectively, wherein the first set of recall rates are determined using the first classification result and the second set of recall rates are determined using the second classification result. In order to enable small classes to be well processed even during the training process, computing device 104 uses the classification results obtained in the training iterations to dynamically adjust the weight coefficients in the loss function. In this adjustment process, computing device 104 acquires the classification results from the previous two iterations after performing a predetermined number of computing iterations on the image classification model. In an example, the predetermined number of iterations is 5. In another example, the predetermined number of iterations is 8. The above examples are intended to describe the present disclosure only and are not specific limitations to the present disclosure. A person skilled in the art may set as needed the number of iterations needed to be performed before one adjustment of the weights of the loss function.

After the predetermined number of training iterations, the result from the first of the two adjacent previous iterations is used to obtain a recall rate corresponding to each of the plurality of object classes to form the first set of recall rates. At the same time, the classification result from the second of the two previous iterations is used to obtain a recall rate corresponding to each of the plurality of object classes to form the second set of recall rates.

At block 208, computing device 104 adjusts, based on the first set of recall rates and the second set of recall rates, the image classification model to obtain a trained image classification model. The computing device uses the obtained two sets of recall rates to adjust the image classification model.

In some embodiments, the computing device uses the first set of recall rates and the second set of recall rates to adjust the loss function of the image classification model. In an example, the computing device determines, based on the first set of recall rates and the second set of recall rates, a plurality of recall rate distances for the plurality of object classes, wherein a recall rate distance refers to the difference between two recall rates. For example, for each of the plurality of classes, the recall rate distance corresponding to that class is obtained by subtracting a recall rate corresponding to that class in the first set of recall rates from a recall rate corresponding to that class in the second set of recall rates.

Computing device 104 then uses a plurality of recall rate distances to adjust the loss function. The process of adjusting the loss function using the plurality of recall rate distances will be described below in conjunction with FIG. 3. After the loss function is adjusted, the adjusted loss function is used to continue the training of the image classification model. In this way, the adjustment of the loss function can be achieved quickly, and the weights of small classes can be increased.

In some embodiments, computing device 104 may also select at least one recall rate distance from the plurality of recall rate distances that is small, for example, being less than a certain distance threshold. An object class corresponding to that at least one recall rate distance is then determined. Then, the image data in the sample image that corresponds to that at least one object class is removed. At this point, the sample image from which the image data has been removed is used for training. In this way, the amount of data to be processed by the image classification model can be reduced, thus increasing the processing rate.

Specifically, in an example, computing device 104 determines a second recall rate distance from the plurality of recall rate distances that is less than a second threshold distance. For example, computing device 104 selects the minimum recall rate distance from the plurality of recall rate distances and may determine an object class that corresponds to that minimum recall rate distance. The computing device then determines a second object class corresponding to the second recall rate distance. The computing device adjusts the sample image by removing pixels in the sample image that correspond to the second object class. The adjusted sample image is then input into the image classification model.

In another example, the computing device determines a plurality of recall rate distances from the plurality of recall rates that are less than a certain threshold and determines a plurality of classes corresponding to the plurality of recall rate distances. The computing device then determines a plurality of object classes corresponding to the plurality of recall rate distances. The computing device adjusts the sample image by removing pixels in the sample image that correspond to the plurality of object classes. The computing device then inputs the adjusted sample image into the image classification model. The above examples are intended to describe the present disclosure only and are not specific limitations to the present disclosure.

Through this method, the weights of small classes can be dynamically adjusted to better balance the accuracy for small and large classes, and the computational cost can be reduced, thus realizing arrangement on edge devices.

The flow chart of method 200 for training an image classification model according to an embodiment of the present disclosure has been described in the foregoing in conjunction with FIG. 2. A flow chart of method 300 for adjusting a loss function according to an embodiment of the present disclosure is described below in conjunction with FIG. 3. Method 300 may be executed at computing device 104 in FIG. 1.

Figure 3:
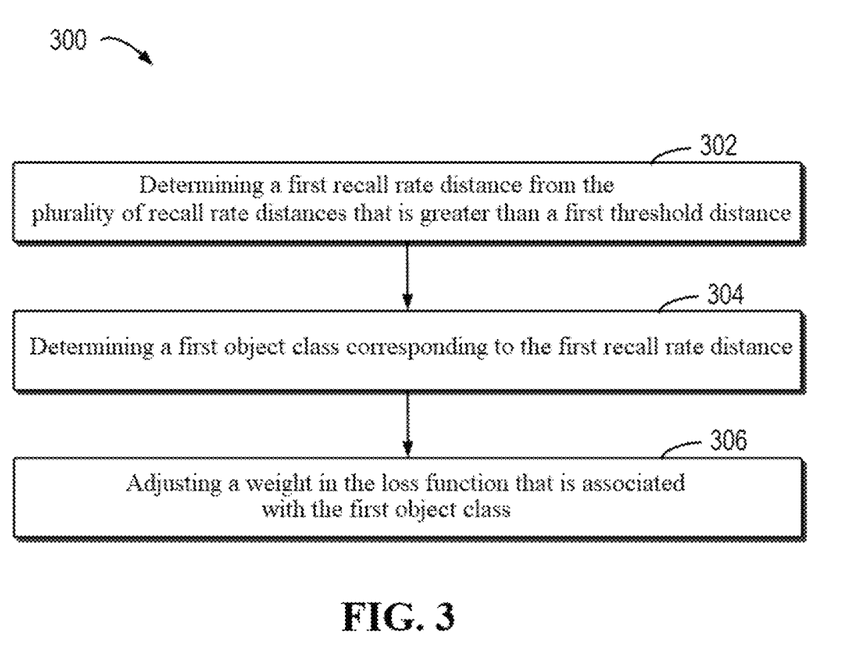
FIG. 3 illustrates a flow chart of a method for adjusting a loss function according to an embodiment of the present disclosure.

At block 302, computing device 104 determines a first recall rate distance from the plurality of recall rate distances that is greater than a first threshold distance. For example, computing device 104 determines the maximum recall rate distance from the plurality of recall rates.

At block 304, computing device 104 determines a first object class corresponding to the first recall rate distance. This first object class typically corresponds to a small class in the image. Then at block 306, computing device 104 adjusts a weight in the loss function that is associated with the first object class.

In an example where the weights of the loss function need to be adjusted when the ith training iteration is performed, if the object class corresponding to the first recall rate distance is determined to be u using the calculation results of the (i−1)th and (i−2)th iterations, the computing device uses the following Equation (2) to adjust the weight corresponding to the object class u to be used in the ith iteration:

$$W_{i,u} = W_{i-1,u} + \beta \quad (2)$$

where $W_{i-1,u}$ denotes the weight for the object class u in the (i−1)th iteration, and β is an adjustment factor, which may be set to any suitable range. In an example, β is 0.2 or 0.5. The above examples are intended to describe the present disclosure only and are not specific limitations to the present disclosure.

The flow chart of method 300 for adjusting a loss function according to an embodiment of the present disclosure has been described in the foregoing in conjunction with FIG. 3.

The processes of determining an object class for which the weight needs to be adjusted and an object class for which the image data needs to be removed will be described in detail below by way of examples. For example, before the ith training iteration is performed, a set D including the maximum recall rate distance and the minimum recall rate distance is determined using the recall rates of the (i−1)th iteration and the (i−2)th iteration in combination with the following Equation (3):

$$D = h_{j \in [1:n]}(M_{i-1,j}, M_{i-2,j}) \quad (3)$$

where n is the number of object classes, $M_{i-1,j}$ denotes a recall rate in the (i−1)th iteration corresponding to the jth class of objects, $M_{i-2,j}$ denotes a recall rate in the (i−2)th iteration corresponding to the jth class of objects, and function h is expressed as the following Equations (4) and (5):

$$\text{Candidate(class)}_u = \text{Argmax}_{j \in [1:n]}((M_{i-1,1} - M_{1-2,1}), \ldots, (M_{i-1,n} - M_{1-2,n})) \quad (4)$$

$$\text{Candidate(class)}_v = \text{Argmin}_{j \in [1:n]}((M_{i-1,1} - M_{1-2,1}), \ldots, (M_{i-1,n} - M_{1-2,n})) \quad (5)$$

where Argmax( ) denotes selecting the maximum value, Argmin( ) denotes selecting the minimum value, i denotes the current iteration, n denotes the number of object classes, u denotes a class corresponding to the maximum value, v denotes a class corresponding to the minimum value, and Candidate(class)$_u$ and Candidate(class)$_v$ denote the maximum and minimum values of the acquired recall rate distance, respectively.

After determining the classes u and v, the computing device then adjusts the weight of the object class u corresponding to the acquired maximum value in the loss function, and removes the image data of the object class v corresponding to the minimum value from the training image for later calculations.

After each training iteration of the image classification model, it is also necessary to determine, based on the loss function value or the number iterations, whether to stop the training process to complete the training.

In some embodiments, computing device 104 may determine, based on the loss function value, whether to stop the training. For example, computing device 104 applies the image classification model to the sample image in each training iteration to determine a first loss function value for the sample image. In addition, after at least one training iteration is completed, computing device 104 also applies the image classification model at this time to a test image to determine a second loss function value for the test image. Computing device 104 then determines a difference between the first loss function value and the second loss function value. If the difference is determined to be less than a threshold, such as 0.1, the training is stopped. If it is greater than or equal to the threshold, the training continues.

In some embodiments, computing device 104 may also determine whether to stop the training by determining the number of consecutive training iterations in which the second loss function value for the test image does not change. For example, computing device 104 determines the number of consecutive training iterations in which the second loss function value for the test image does not change, and then compares this number of consecutive training iterations to a first threshold number, such as a first threshold number of 20. If this number of consecutive training iterations exceeds the first threshold number, the training is stopped; and if not, the training continues.

In some embodiments, computing device 104 may also determine whether to stop the training based on the total number of training iterations. Specifically, computing device 104 first determines the total number of training iterations for the image classification model. Computing device 104 then compares the total number of training iterations to a second threshold number of training iterations, for example, a second threshold number of iterations of 250. Additionally, the second threshold number of iterations is greater than the first threshold number of iterations. If the total number of iterations exceeds the second threshold number of iterations, the training is stopped; and if not, the training continues.

In some embodiments, computing device 104 may combine the above three approaches to determine whether to stop training. For example, computing device 104 may determine after each iteration operation whether the difference between the first loss function value and the second loss function value is less than a threshold, and if it is less than the threshold, the training is stopped. If it is not less than the threshold, and if the number of consecutive training iterations in which the second loss function value for the test image does not change exceeds the first threshold number, the training is stopped. If the difference between the first loss function value and the second loss function value is not less than the threshold and the number of consecutive training iterations in which the second loss function value for the test image does not change does not exceed the first threshold number, it is determined whether to stop training by checking whether the total number of training iterations exceeds the second threshold number. The above examples are intended to describe the present disclosure only and are not intended to be specific limitations to the present disclosure.

Figure 4:
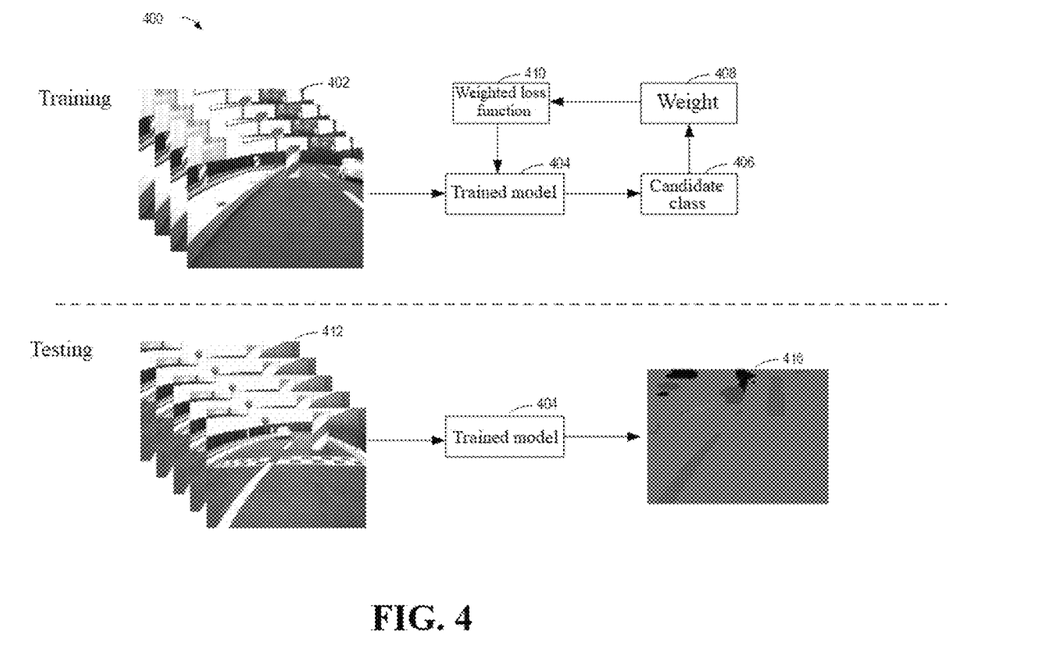
FIG. 4 illustrates a schematic diagram of an example of training an image classification model according to an embodiment of the present disclosure.

An illustrative example 400 for training an image classification model according to an embodiment of the present disclosure is described below in conjunction with FIG. 4.

In the example of training an image classification model, two phases are included, namely the training phase and the testing phase. In an example, a test is performed once for each training iteration performed. In another example, a test is performed once for every multiple training iterations performed. The above examples are intended to describe the present disclosure only and are not specific limitations to the present disclosure.

At the beginning of training, the initial values of the weights of the loss function of the image classification model are set based on the number of object classes to be classified by the image classification model. Sample image 402 is then input into the trained model 404 to classify each of the pixels in the image to determine which object class it belongs to. The loss function is then calculated to further adjust parameters of the image classification model. After a predetermined number of training iterations, the weights of the loss function need to be adjusted. For example, the weights are adjusted once every five iterations. If the weights need to be adjusted at the ith iteration, the recall rates for multiple object classes after each iteration is determined based on the classification results of the previous two neighboring iterations i–1 and i–2. Then for each object class, the recall rate for the (i–2)th iteration is subtracted from the recall rate for the (i–1)th iteration to determine the recall rate distance for each object class. The recall rate distance is then used to determine candidate class 406.

Candidate class 406 includes a first object class corresponding to the maximum recall rate distance of the plurality of recall rate distances. Weight 408 in the loss function corresponding to this first object class is then adjusted. At this point, an updated weighted loss function 410 is formed. The model is then continued to be trained using the updated weighted loss function.

Alternatively, the candidate class also includes other object classes. Since the recall rate for a class with a large amount of data in the image is relatively accurate, the recall rate distance for such a class usually does not vary much. Therefore, to reduce the computational amount for such a class of data, the minimum recall rate distance may be selected from the plurality of recall rate distances. The second object class corresponding to the minimum recall rate distance is determined. Then, the corresponding data in the training image is removed to form an adjusted training image, and the training is continued with the adjusted training image. At the same time, the recall rate distance for this second object class is saved, and if an object class for which the recall rate distance is smaller than that for this second object class exists in later calculations, the model continues to be trained in a new training process using the training image including the image data corresponding to the second object class.

In some embodiments, a testing phase is set up in order to appropriately stop the training of the model. The trained model 404 is tested using test image 412 to obtain classification result 416. Alternatively or additionally, a test may be performed once after every at least one training iteration. The loss function value of the testing phase, the loss function value of the training phase, and the number of training iterations are then used to determine the termination of training. The conditions for its stopping are as described in the examples above.

Through this method, the weights of small classes can be dynamically adjusted to better balance the accuracy for small and large classes, and the computational cost can be reduced, thus realizing arrangement on edge devices.

Figure 5:
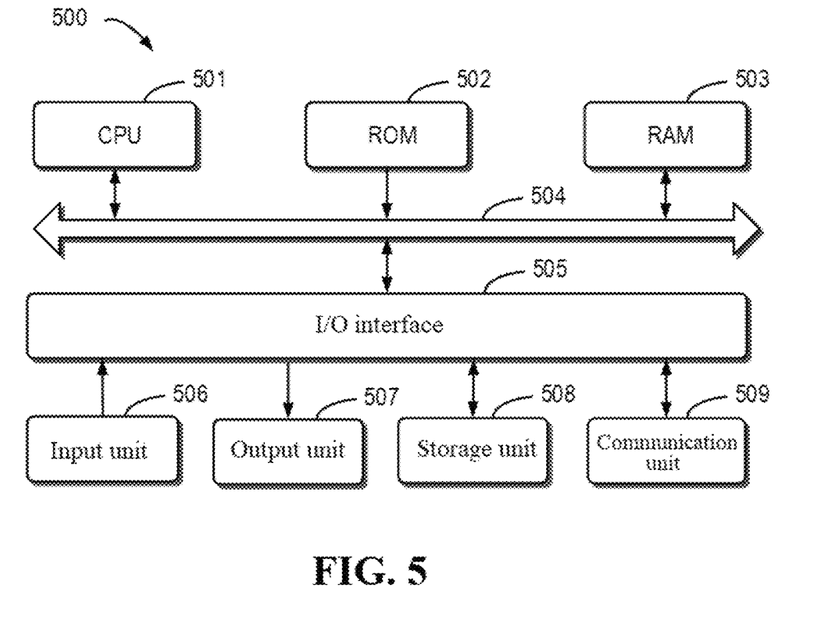
FIG. 5 illustrates a schematic block diagram of an example device suitable for implementing embodiments of the content of the present disclosure.

FIG. 5 shows a schematic block diagram of example device 500 that may be used to implement embodiments of the present disclosure. Computing device 104 in FIG. 1 may be implemented by device 500. As shown in the figure, device 500 includes central processing unit (CPU) 501, which may execute various appropriate actions and processing in accordance with computer program instructions stored in read-only memory (ROM) 502 or computer program instructions loaded from storage unit 508 onto random access memory (RAM) 503. Various programs and data required for operations of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

The various processes and processing described above, such as method 200 and method 300, may be performed by CPU 501. For example, in some embodiments, methods 200 and 300 may be implemented as a computer software program that is tangibly included in a machine-readable medium, such as storage unit 508. In some embodiments, part of or all the computer program may be loaded and/or installed to device 500 via ROM 502 and/or communication unit 509. When the computer program is loaded into RAM 503 and executed by CPU 501, one or more actions of methods 200 and 300 described above may be performed.

Embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

Illustrative embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments or technical improvements to technologies on the market, so as to enable persons of ordinary skill in the art to understand the embodiments disclosed herein.

What is claimed is:

1. A method for training an image classification model, comprising:
    determining a first classification result obtained by the image classification model on pixel points of a sample image in a first training iteration, wherein the first classification result indicates that each of the pixel points belongs to one of a plurality of object classes;
    determining a second classification result obtained by the image classification model on the pixel points of the sample image in a second training iteration;
    determining, based on the first classification result and the second classification result, a first set of recall rates and a second set of recall rates for the plurality of object classes; and adjusting, based on the first set of recall rates and the second set of recall rates, the image classification model to obtain a trained image classification model;
wherein adjusting the image classification model comprises:
determining, based on the first set of recall rates and the second set of recall rates, a plurality of recall rate distances for the plurality of object classes; and
adjusting one or more weights utilized in training the image classification model based on the plurality of recall rate distances.

2. The method according to claim 1, wherein adjusting the image classification model comprises:
adjusting a loss function of the image classification model based on the first set of recall rates and the second set of recall rates; and
training the image classification model using the adjusted loss function.

3. The method according to claim 2, wherein adjusting a loss function of the image classification model comprises:
adjusting the loss function based on the plurality of recall rate distances.

4. The method according to claim 3, wherein adjusting the loss function based on the plurality of recall rate distances comprises:
determining a first recall rate distance from the plurality of recall rate distances that is greater than a first threshold distance;
determining a first object class corresponding to the first recall rate distance; and
adjusting a weight in the loss function that is associated with the first object class.

5. The method according to claim 3, further comprising:
determining a second recall rate distance from the plurality of recall rate distances that is less than a second threshold distance;
determining a second object class corresponding to the second recall rate distance;
adjusting the sample image by removing a pixel corresponding to the second object class from the sample image; and
inputting the adjusted sample image into the image classification model.

6. The method according to claim 1, further comprising:
initializing, based on the number of the plurality of object classes, a plurality of weights for a loss function of the image classification model.

7. The method according to claim 1, further comprising:
applying the image classification model to the sample image to determine a first loss function value for the sample image;
applying the image classification model to a test image to determine a second loss function value for the test image;
determining a difference between the first loss function value and the second loss function value; and
stopping the training if the difference is determined to be less than a threshold.

8. The method according to claim 7, further comprising:
determining the number of consecutive training iterations in which the second loss function value for the test image does not change; and
stopping the training if the number of consecutive training iterations exceeds a first threshold number.

9. The method according to claim 1, further comprising:
determining a total number of training iterations for the image classification model; and stopping the training if the total number of training iterations exceeds a second threshold number.

10. An electronic device, comprising:
at least one processor; and
a memory coupled to the at least one processor and having instructions stored therein, wherein the instructions, when executed by the at least one processor, cause the electronic device to perform actions for training an image classification model, the actions comprising:
determining a first classification result obtained by the image classification model on pixel points of a sample image in a first training iteration, wherein the first classification result indicates that each of the pixel points belongs to one of a plurality of object classes;
determining a second classification result obtained by the image classification model on the pixel points of the sample image in a second training iteration;
determining, based on the first classification result and the second classification result, a first set of recall rates and a second set of recall rates for the plurality of object classes; and
adjusting, based on the first set of recall rates and the second set of recall rates, the image classification model to obtain a trained image classification model;
wherein adjusting the image classification model comprises:
determining, based on the first set of recall rates and the second set of recall rates, a plurality of recall rate distances for the plurality of object classes; and
adjusting one or more weights utilized in training the image classification model based on the plurality of recall rate distances.

11. The electronic device according to claim 10, wherein adjusting the image classification model comprises:
adjusting a loss function of the image classification model based on the first set of recall rates and the second set of recall rates; and
training the image classification model using the adjusted loss function.

12. The electronic device according to claim 11, wherein adjusting a loss function of the image classification model comprises:
adjusting the loss function based on the plurality of recall rate distances.

13. The electronic device according to claim 12, wherein adjusting the loss function based on the plurality of recall rate distances comprises:
determining a first recall rate distance from the plurality of recall rate distances that is greater than a first threshold distance;
determining a first object class corresponding to the first recall rate distance; and
adjusting a weight in the loss function that is associated with the first object class.

14. The electronic device according to claim 12, wherein the actions further comprise:
determining a second recall rate distance from the plurality of recall rate distances that is less than a second threshold distance;
determining a second object class corresponding to the second recall rate distance;
adjusting the sample image by removing a pixel corresponding to the second object class from the sample image; and
inputting the adjusted sample image into the image classification model.

15. The electronic device according to claim 10, wherein the actions further comprise:
    initializing, based on the number of the plurality of object classes, a plurality of weights for a loss function of the image classification model.

16. The electronic device according to claim 10, wherein the actions further comprise:
    applying the image classification model to the sample image to determine a first loss function value for the sample image;
    applying the image classification model to a test image to determine a second loss function value for the test image;
    determining a difference between the first loss function value and the second loss function value; and
    stopping the training if the difference is determined to be less than a threshold.

17. The electronic device according to claim 16, wherein the actions further comprise:
    determining the number of consecutive training iterations in which the second loss function value for the test image does not change; and
    stopping the training if the number of consecutive training iterations exceeds a first threshold number.

18. The electronic device according to claim 10, wherein the actions further comprise:
    determining a total number of training iterations for the image classification model; and
    stopping the training if the total number of training iterations exceeds a second threshold number.

19. A computer program product tangibly stored on a non-transitory computer-readable medium and comprising machine-executable instructions, wherein the machine-executable instructions, when executed by a machine, cause the machine to perform actions for training an image classification model, the actions comprising:
    determining a first classification result obtained by the image classification model on pixel points of a sample image in a first training iteration, wherein the first classification result indicates that each of the pixel points belongs to one of a plurality of object classes;
    determining a second classification result obtained by the image classification model on the pixel points of the sample image in a second training iteration;
    determining, based on the first classification result and the second classification result, a first set of recall rates and a second set of recall rates for the plurality of object classes; and
    adjusting, based on the first set of recall rates and the second set of recall rates, the image classification model to obtain a trained image classification model;
    wherein adjusting the image classification model comprises:
    determining, based on the first set of recall rates and the second set of recall rates, a plurality of recall rate distances for the plurality of object classes; and
    adjusting one or more weights utilized in training the image classification model based on the plurality of recall rate distances.

20. The computer program product according to claim 19, wherein adjusting the image classification model comprises:
    adjusting a loss function of the image classification model based on the first set of recall rates and the second set of recall rates; and
    training the image classification model using the adjusted loss function.

* * * * *